(12) United States Patent
Suzuki (10) Patent No.: US 10,040,353 B2
(45) Date of Patent: Aug. 7, 2018

(54) INFORMATION DISPLAY SYSTEM

(71) Applicant: DENSO CORPORATION, Kariya, Aichi-pref. (JP)

(72) Inventor: Takamitsu Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 16 days.

(21) Appl. No.: 15/123,713

(22) PCT Filed: Mar. 24, 2015

(86) PCT No.: PCT/JP2015/001666
§ 371 (c)(1),
(2) Date: Sep. 6, 2016

(87) PCT Pub. No.: WO2015/151457
PCT Pub. Date: Oct. 8, 2015

(65) Prior Publication Data
US 2017/0015198 A1    Jan. 19, 2017

(30) Foreign Application Priority Data
Mar. 31, 2014    (JP) .................................. 2014-072296

(51) Int. Cl.
*B60K 35/00*    (2006.01)
*G09G 5/00*    (2006.01)
(Continued)

(52) U.S. Cl.
CPC ............ *B60K 35/00* (2013.01); *G06F 3/1423* (2013.01); *G06K 9/00845* (2013.01);
(Continued)

(58) Field of Classification Search
CPC ............ B60K 35/00; B60K 2350/1072; B60K 2350/1096; B60K 2350/901;
(Continued)

(56) References Cited

U.S. PATENT DOCUMENTS

2011/0309925 A1* 12/2011 Ishibashi ................ B60K 35/00
340/438
2014/0250395 A1* 9/2014 Tanaka .................... G06F 3/013
715/765

FOREIGN PATENT DOCUMENTS

JP    2002019491 A    1/2002
JP    2003291688 A    10/2003
(Continued)

*Primary Examiner* — Stephen G Sherman
(74) *Attorney, Agent, or Firm* — Harness, Dickey & Pierce, P.L.C.

(57) ABSTRACT

An information display system displaying different information on each of a plurality of display units includes: a sight line specifying portion that specifies a line of sight of a driver; a cognition display unit specifying portion that specifies, as a cognition display unit, one of the display units being in a direction of the line of sight; a non-cognition display unit specifying portion that specifies, as a non-cognition display unit, a different one of the display units; a priority order assignment portion that assigns a priority order to the non-cognition display unit or displayed information; and a guide process execution portion that executes a guide process in which the line of sight is guided to the non-cognition display unit or the display unit.

8 Claims, 5 Drawing Sheets

(51) Int. Cl.
  *G08G 1/16* (2006.01)
  *G06K 9/00* (2006.01)
  *G06F 3/14* (2006.01)

(52) U.S. Cl.
  CPC ............ *G08G 1/167* (2013.01); *G09G 5/00* (2013.01); *G09G 5/003* (2013.01); *B60K 2350/1072* (2013.01); *B60K 2350/1096* (2013.01); *B60K 2350/901* (2013.01); *G09G 2320/0261* (2013.01); *G09G 2380/10* (2013.01)

(58) Field of Classification Search
  CPC .. G06F 3/1423; G06K 9/00845; G08G 1/167; G09G 5/00; G09G 5/003; G09G 2320/0261; G09G 2380/10
  USPC ......................................................... 345/1.3
  See application file for complete search history.

(56) References Cited

FOREIGN PATENT DOCUMENTS

| | | | |
|---|---|---|---|
| JP | 2003302470 | A | 10/2003 |
| JP | 2005135037 | A | 5/2005 |
| JP | 2008176459 | A | 7/2008 |
| JP | 2011221630 | A | 11/2011 |
| JP | 2012113672 | A | 6/2012 |
| JP | 2015026185 | A | 2/2015 |

\* cited by examiner

INFORMATION DISPLAY SYSTEM

CROSS-REFERENCE TO RELATED APPLICATIONS

This application is a U.S. National Phase Application under 35 U.S.C. 371 of International Application No. PCT/JP2015/001666 filed on Mar. 24, 2015 and published in Japanese as WO 2015/151457 A1 on Oct. 8, 2015. This present application is based on and claims the benefit of priority from Japanese Patent Application No. 2014-072296 filed on Mar. 31, 2014. The entire disclosures of all of the above applications are incorporated herein by reference.

TECHNICAL FIELD

The present disclosure relates to an information display system.

BACKGROUND ART

A center display that serves as a display unit for a navigation device and an audio device is a typical example of display units mounted on vehicles. Other examples include a meter-type display unit for displaying a vehicle speed, a rotation speed of an engine, or the like. Further, in recent years, a vehicle having a head-up display in which information is displayed on a windshield has been studied (refer to, for example, Patent Literature 1).

The inventor of the present application has found the following knowledge regarding the information display system. On the display units described above, different pieces of information are respectively displayed. Examples of the pieces of information displayed on these display units include important information related to safety of a person on the vehicle, information used for driving the vehicle, information for obtaining convenience and comfort, and information for satisfying interests and preference of the person on the vehicle. Therefore, in a configuration in which different pieces of information are displayed respectively on a plurality of display units, it is required to prioritize important information whose relation to safety is stronger, and cause a driver to perceive such important information. However, in a configuration in which there are multiple display units, a driver does not necessarily see a display unit on which important information to be perceived is displayed. In particular, when different pieces of information are displayed on the multiple display units at the same time, the driver may possibly miss a display unit on which important information to be perceived is displayed.

PRIOR ART LITERATURE

Patent Literature

Patent Literature 1: JP 2002-19491 A

SUMMARY OF INVENTION

It is an object of the present disclosure is to provide an information display system having multiple display units for displaying different pieces of information, the system causing a driver to preferentially perceive one of the display units on which important information to be perceived is displayed.

According to an information display system regarding the present disclosure, a sight line specifying portion specifies a line of sight of a driver. A cognition display unit specifying portion specifies, as a cognition display unit perceived by the driver, one of the display units which the line of sight specified by the sight line specifying portion overlaps with. A non-cognition display unit specifying portion specifies, as a non-cognition display unit, a different one of the display units being not specified as the cognition display unit. A priority order assignment portion assigns a priority order to the non-cognition display unit or displayed information based on information displayed on the non-cognition display unit. A guide process execution portion executes, when the line of sight of the driver specified by the sight line specifying portion is not directed to the non-cognition display unit having a higher priority order or a display unit displaying the displayed information having a higher priority order is displayed, a guide process in which the line of sight of the driver is guided to the non-cognition display unit having the higher priority order or the display unit displaying the displayed information having the higher priority order.

According to the information display system of the present disclosure, the guide process is executed when the driver does not perceive the display unit to which a highest priority order is assigned, and the guide process may guide the line of sight of the driver to the display unit to which the highest priority order is assigned. Therefore, it is possible to cause the driver to preferentially perceive a display unit on which important information to be perceived is displayed.

BRIEF DESCRIPTION OF DRAWINGS

The above and other aspects, features and advantages of the present disclosure will become more apparent from the following detailed description made with reference to the accompanying drawings. In the drawings.

PREFERRED EMBODIMENTS FOR CARRYING OUT INVENTION

Figure 1:
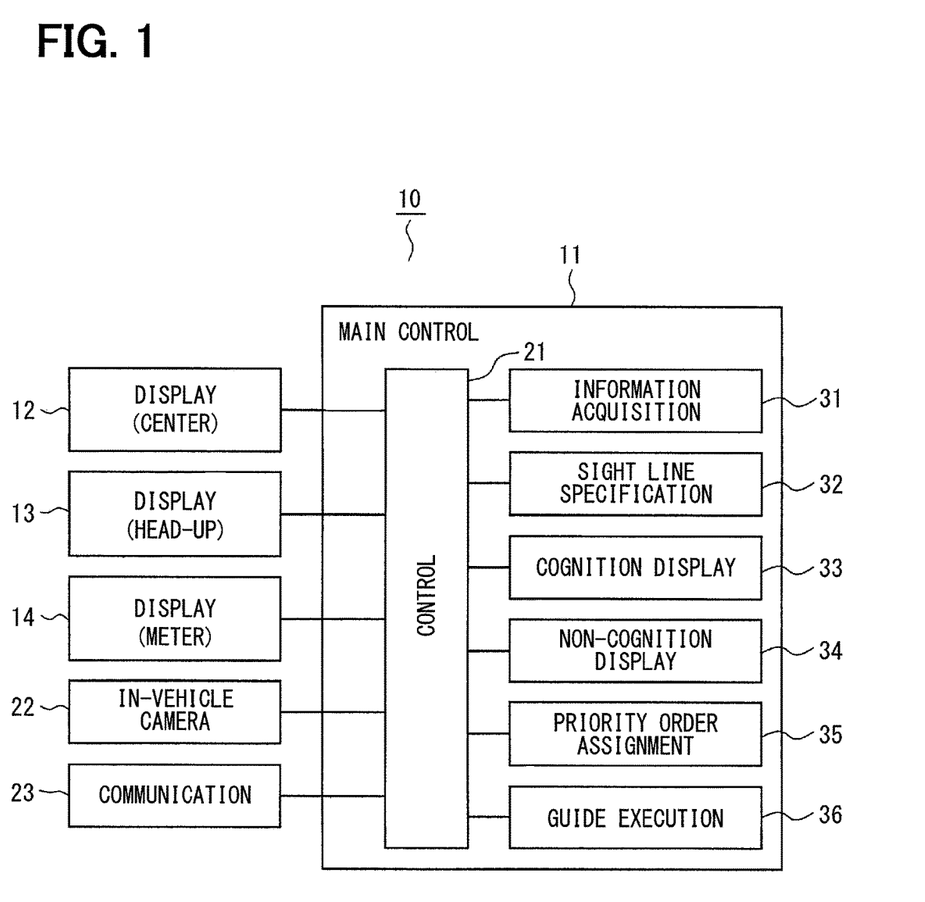
FIG. 1 is a block diagram schematically illustrating an example of a configuration of an information display system.

Hereinafter, one embodiment of the present disclosure will be described with reference to the drawings. An information display system 10 illustrated in FIG. 1 is mounted on a vehicle, and includes a main control device 11, multiple display units 12, 13, 14, or the like. The main control device 11 includes a control unit 21. Further, to the main control device 11, an in-vehicle camera 22, a communication unit 23, or the like are connected. The control unit 21 is provided with a CPU, a RAM, and a ROM (not shown), and controls an overall operation of the main control device 11. The in-vehicle camera 22 is provided, for example, on the front of the driver seat within the vehicle, takes an image of a driver within the vehicle, and outputs data of the taken image to the control unit 21. The communication unit 23 is, for example, constituted of a wireless communication module or the like, and establishes wireless communication with an external Internet access point or an external information communication device (not shown) to perform various kinds of communication.

Figure 2:
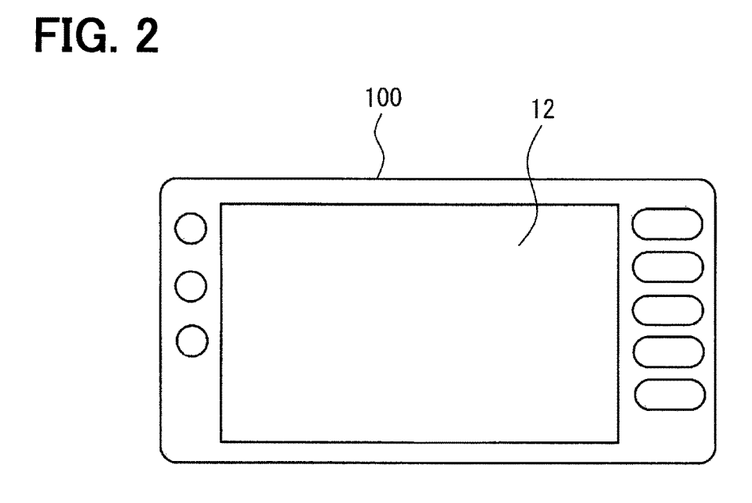
FIG. 2 is a diagram illustrating a center display.

As illustrated in FIG. 2, the display unit 12 is constituted of a center display servings as a display unit of a vehicular device 100 such as a navigation device or an audio device mounted on the vehicle. When the vehicle moves backward, an image taken by a rear camera (not shown) is displayed on the display unit 12. Specifically, the display unit 12 may serve as a so-called back monitor.

Figure 3:
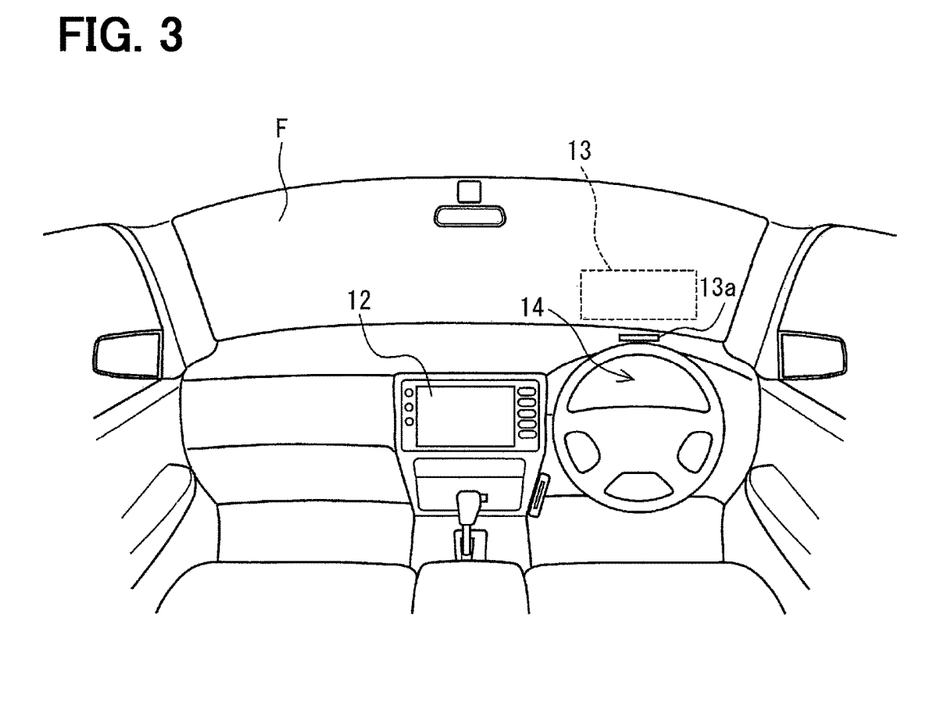
FIG. 3 is a diagram illustrating a head-up display.
Figure 4:
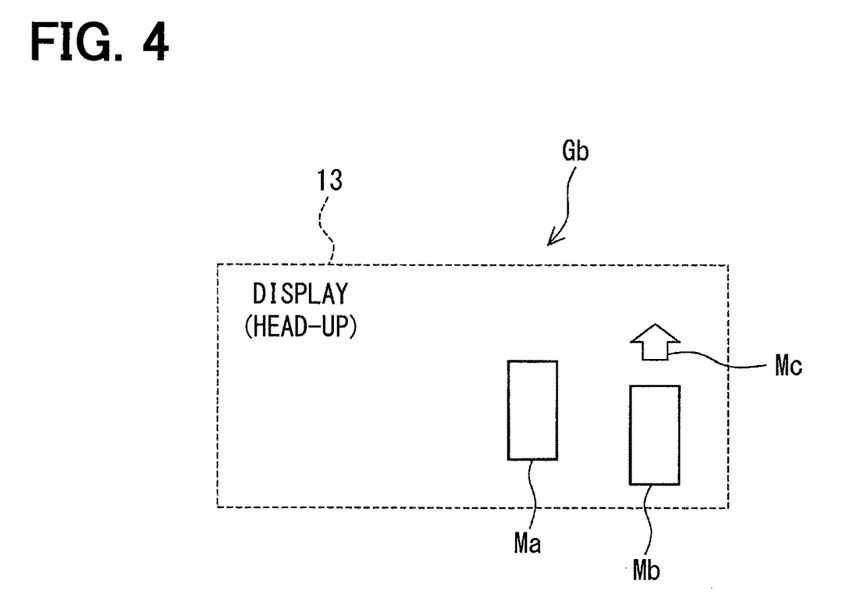
FIG. 4 is a diagram illustrating a blind spot screen.

As illustrated in FIG. 3, the display unit 13 is constituted of a head-up display that displays information on a windshield F of the vehicle. The display unit 13 has a configuration in which information is projected on the windshield F from a display unit 13a provided for an instrument panel of the vehicle. On the display unit 13, various types of information may be displayed such as a blind spot screen Gb illustrated in FIG. 4, or an empty mark (not shown). The blind spot screen Gb is a screen showing conditions on the backward left and the backward right of the vehicle based on imaging data taken by cameras (not shown) that are provided on the left side and the right side of the vehicle. Specifically, the blind spot screen Gb shows marks such as a subject vehicle mark Ma schematically showing a subject vehicle, an another vehicle mark Mb schematically showing another vehicle that is on the backward left or the backward right of the subject vehicle, and a traveling direction mark Mc indicating a traveling direction of the other vehicle. The empty mark is a mark indicating that a remained amount of fuel is low.

Figure 5:
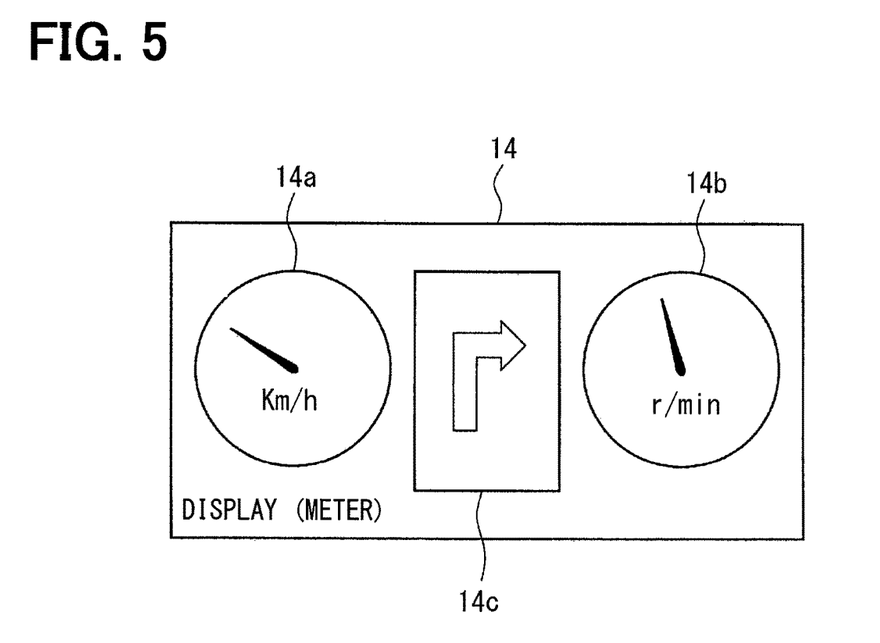
FIG. 5 is a diagram illustrating a meter-type display.

As illustrated in FIG. 5, the display unit 14 is constituted of meter-type displays for displaying a vehicle speed, a rotation speed of an engine, or the like. In this case, the display unit 14 includes a display block 14a for displaying a vehicle speed, and a display block 14b for displaying a revolution speed of an engine. Further, the display unit 14 includes a display block 14c between the display blocks 14a, 14b. The display block 14c is constituted of a liquid crystal display device, for example. The display block 14c may display a traveling direction, for example, a right turn direction or a left turn direction, at a branch point such as an intersection. Specifically, the display block 14c may serve as a display unit responding to a so-called turn-by-turn function. Further, the display block 14c may display a gear position that is being selected.

The main control device 11 causes the control unit 21 to execute a control program, and thus virtually realizes an information acquisition processor 31, a sight line specifying processor 32, a cognition display unit specifying processor 33, a non-cognition display unit specifying processor 34, a priority order assigning processor 35, and a guide process execution processor 36 as software. These processors 31 to 36 may be realized, for example, as an integrated circuit integrated with the control unit 21 as hardware.

The information acquisition processor 31 is one example of an information acquisition portion, and acquires pieces of information respectively displayed on the display units 12, 13, 14. Specifically, the information acquisition processor 31 acquires data for specifying display contents displayed on the display units 12, 13, 14. The sight line specifying processor 32 is one example of a sight line specifying portion, and specifies a line of sight of the driver. Specifically, the sight line specifying processor 32 specifies a line of sight of the driver by executing a known line-of-sight analysis process for specifying a line of sight of a driver. To explain in concrete terms, the sight line specifying processor 32 extracts an eyeball of a driver from the taken image data taken by the in-vehicle camera 22, and specifies a line of sight of the driver from movement and conditions of the eyeball that have been extracted. Further, the sight line specifying processor 32 is able to specify a position of a point of regard of the driver, that is, a position at which the driver pays attention, based on the specified line of sight.

The cognition display unit specifying processor 33 is one example of a cognition display unit specifying portion, and specifies, as a cognition display unit, one of the display units 12, 13, 14 which overlaps with a line of sight specified by the sight line specifying processor 32, that is, a display unit present on a direction along the line of sight of the driver. Specifically, the cognition display unit specifying processor 33 monitors whether the line of sight specified by the sight line specifying processor 32 is directed toward the display unit 12, 13, or 14, that is, the point of regard of the driver is on any of the display units 12, 13, 14. When the line of sight of the driver is directed toward any of the display units 12, 13, 14, that is, when the point of regard of the driver is within a frame of any of the display units 12, 13, 14, the cognition display unit specifying processor 33 determines that the line of sight of the driver overlaps with this display unit, and specifies this display unit as the cognition display unit.

Further, in this case, when the line of sight specified by the sight line specifying processor 32 overlaps with any of the display units 12, 13, 14 in a state in which information is being displayed, the cognition display unit specifying processor 33 specifies this display unit as the cognition display unit. Specifically, even when the line of sight of the driver overlaps with any of the display units 12, 13, 14 in a state in which information is not displayed, the cognition display unit specifying processor 33 does not set this display unit as the cognition display unit.

The display unit specified as the cognition display unit is set as a display unit that is seen and perceived by the driver. It should be noted that a storage medium (not shown) that is provided for the main control device 11 stores in advance display unit attribute data for specifying installation positions in a vehicle interior, sizes, and shapes of the display units 12, 13, 14. The cognition display unit specifying processor 33 determines whether the line of sight of the driver overlaps with a display unit by checking the display unit attribute data with vectorial data indicating a direction of the line of sight of the driver specified by the sight line specifying processor 32, or position coordinate data indicating a position of the point of regard of the driver.

The non-cognition display unit specifying processor 34 is one example of a non-cognition display unit specifying portion, and specifies any of the display units 12, 13, 14 that is not specified as the cognition display unit as a non-cognition display unit. The display unit specified as the non-cognition processor is set as a display unit that is not either seen or perceived by the driver.

Figure 6:
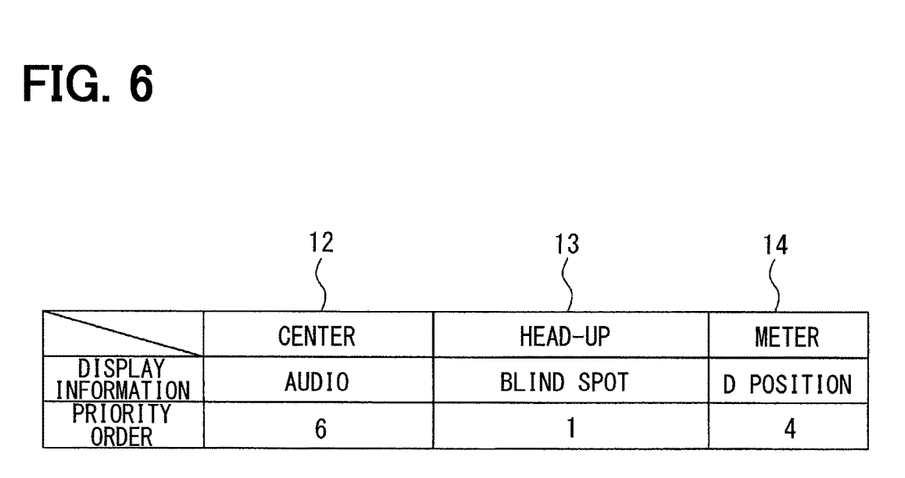
FIG. 6 is a table of an example of setting of priority orders.

The priority order assigning processor 35 is one example of a priority order assignment portion, and assigns a priority order to the non-cognition display unit based on information displayed on a display unit that is set as the non-cognition display unit. An example of setting of priority orders shown in FIG. 6 shows an example of setting in a case in which the vehicle moves forward. In this case, the priority order assigning processor 35 assigns a priority order "6" to the display unit 12 on which a audio screen is displayed, a priority order "1" to the display unit 13 on which a blind spot screen is displayed, and a priority order "4" to the display unit 14 on which a gear position is shown in a D (Drive) position.

Specifically, in a normal driving where the vehicle moves forward, the blind spot screen shows important information related to driving safety of the vehicle. Therefore, the priority order assigning processor 35 assigns a higher priority order to the display unit 13 on which the important information is displayed. On the other hand, as the audio screen shows information less related to driving safety of the vehicle, the priority order assigning processor 35 assigns a lower priority order to the display unit 12 on which such less important information is displayed. It should be noted that a smaller number indicates higher priority in the priority orders, and the priority order "1" is the order with highest priority.

Figure 7:
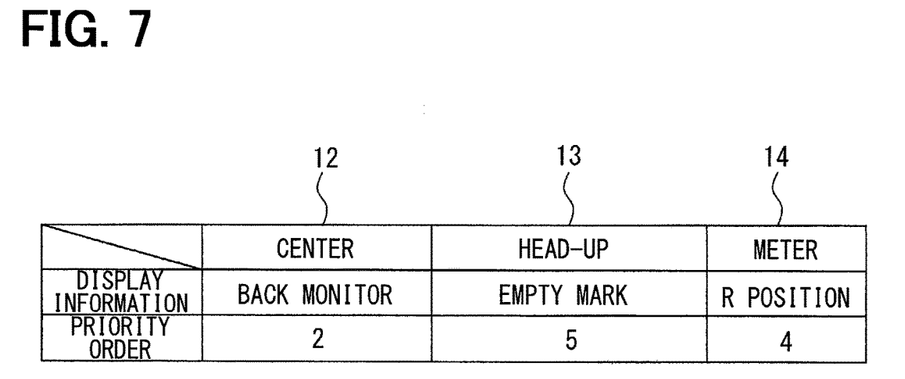
FIG. 7 is a table of an example of setting of priority orders.

Further, an example of setting of priority orders shown in FIG. 7 shows an example of setting in a case in which the vehicle moves backward. In this case, the priority order assigning processor 35 assigns a priority order "2" to the display unit 12 on which a back monitor screen is displayed, a priority order "5" to the display unit 13 on which an empty mark is displayed, and a priority order "4" to the display unit 14 on which a gear position is shown in a R position. Specifically, in a situation where the vehicle moves backward, the back monitor screen shows important information related to driving safety of the vehicle. Therefore, the priority order assigning processor 35 assigns a higher priority order to the display unit 12 on which the important information is displayed. On the other hand, as the empty mark shows information less related to driving safety of the vehicle, the priority order assigning processor 35 assigns a lower priority order to the display unit 13 on which such less important information is displayed.

Further, the priority order assigning processor 35 may assign a priority order to information (content) itself displayed on the non-cognition display unit.

The guide process execution processor 36 is one example of a guide process execution portion, and after completion of the priority order assigning process by the priority order assigning processor 35, the guide process execution processor 36 monitors weather or not the line of sight specified by the sight line specifying processor 32 overlaps with the non-cognition display unit to which a higher priority order, in this case, the highest priority order, is assigned. Then, when the line of sight of the driver does not overlap with the non-cognition display unit to which the highest priority order is assigned, that is, when the line of sight of the driver is not directed to the non-cognition display unit to which the highest priority order is assigned, the guide process execution processor 36 executes a guide process for leading the line of sight of the driver to the non-cognition display unit.

Further, when the priority order assigning processor 35 assigns a priority order to information itself displayed in the non-cognition display unit, the guide process execution processor 36 executes the guide process when the line of sight of the driver is not directed to a display unit displaying information to which a higher priority order, in this case, the highest priority order, is assigned.

Figure 8:
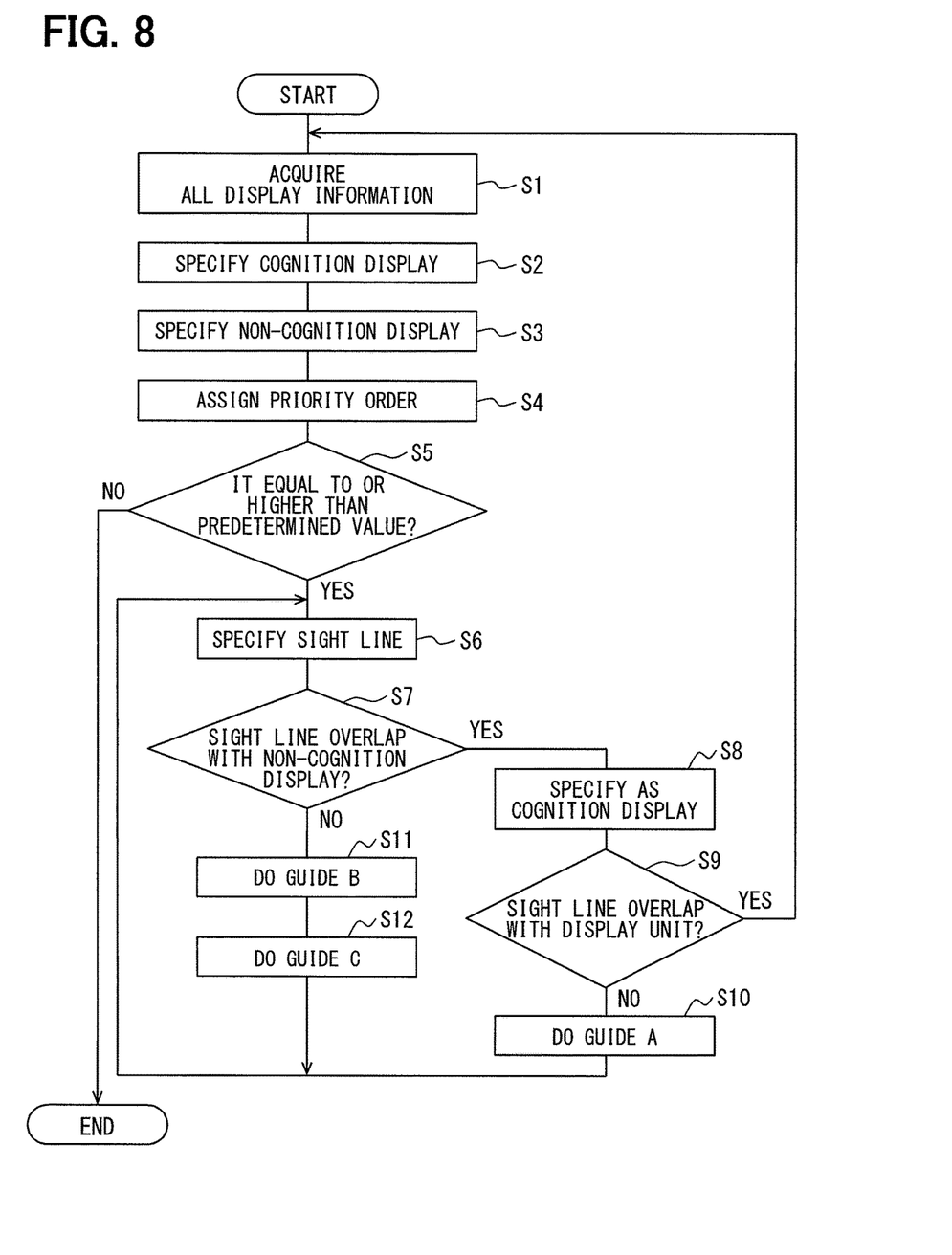
FIG. 8 is a flowchart showing an example of control by the information display system.

An example of control of the information display by the information display system 10 will be described. This control is mainly performed by the main control device 11. For example, as illustrated in FIG. 8, the main control device 11 acquires information displayed in all of the display units 12, 13, 14 mounted on the vehicle (S1). Then, while specifying the line of sight of the driver as needed, the main control device 11 specifies a display unit with which the line of sight of the driver overlaps as the cognition display unit (S2). Further, the main control device 11 specifies a display unit that is not specified as the cognition display unit as the non-cognition display unit (S3).

Then, the main control device 11 assigns a priority order to the non-cognition display unit based on information displayed on the non-cognition display unit (S4). It should be noted that timing at which the priority order is assigned may be set differently as needed, such as timing at which a predetermined time period elapses after the control is started, at which a predetermined time period elapses after the process in S1 is completed, and at which a content displayed on a part of the non-cognition display units is updated, for example. Then, the main control device 11 confirms whether there is a display unit to which a priority order higher than a predetermined value that is set in advance is assigned (S5). The predetermined value may be set differently as needed considering connection with safety of a person on the vehicle. In this case, "2" is set as the predetermined value.

When there is no display unit to which a priority order higher than the predetermined value is assigned (NO in S5), the main control device 11 terminates the process. On the other hand, when there is a display unit to which a priority order higher than the predetermined value is assigned (YES in S5), the main control device 11 specifies the line of sight of the driver using the in-vehicle camera 22 (S6). Then, the main control device 11 monitors whether the line of sight of the driver overlaps with any of non-cognition display units (S7). The non-cognition display unit to be determined in S7 may have a priority order equal to or higher than the predetermined value or lower than the predetermined value.

When the line of sight of the driver overlaps with any of the non-cognition display units (YES in S7), the main control device 11 specifies the non-cognition display unit as the cognition display unit (S8). Then, the main control device 11 determines whether the line of sight of the driver overlaps with the non-cognition display unit to which the highest priority order is assigned (S9). When the line of sight of the driver overlaps with the non-cognition display unit to which the highest priority order is assigned (YES in S9), the main control device 11 shifts the process to the process in S1. On the other hand, when the line of sight of the driver does not overlap with the non-cognition display unit to which the highest priority order is assigned (NO in S9), the main control device 11 executes a guide process A (S10).

In the guide process A, the main control device 11 executes a process for showing a direction in which the non-cognition display unit to which the highest priority order is assigned is present in a display unit to which the line of sight of the driver is directed. Specifically, for example, in a state in which the line of sight of the driver does not overlap with the head-up display 13 on which the blind spot screen is shown, when the line of sight of the driver is directed to the meter-type display 14, the main control device 11 displays a direction mark indicating a direction in which the head-up display 13 is present in the display block 14c of the meter-type display 14.

Further, in the guide process A, the main control device 11 may display simplified information, in a display unit with which the line of sight of the driver overlaps, of information displayed in the non-cognition display unit to which the highest priority order is assigned. Specifically, the main control device 11 specifies a display unit to which the line of sight of the driver is directed at this time point. Then, the main control device 11 displays simplified information, in the specified display unit, of the information displayed in the non-cognition display unit to which the highest priority order is assigned. For example, in a state in which the line of sight of the driver does not overlap with the head-up display 13 on which the blind spot screen is shown and the line of sight of the driver is directed to the center display 12, the main control device 11 displays, in the center display 12, information indicating a content of the blind spot screen in a simplified manner, for example, text information saying "There is a car on the backward right".

Upon completion of the guide process A, the main control device 11 shifts the process to the process in S6. Further, when the line of sight of the driver does not overlap with any non-cognition display unit (NO in S7), the main control device 11 executes a guide process B (S11). In the guide process B, the main control device 11 outputs a name of the non-cognition display unit to which the highest priority order is assigned by sound through a loudspeaker (not shown). Specifically, for example, in a state in which the line of sight of the driver does not overlap with the head-up display 13 on which the blind spot screen is shown, when the line of sight of the driver is not directed to any of the remaining display units 12, 14, the main control device 11 outputs sound information including the name of the display unit 13 and saying "Please check the head-up display".

Upon completion of the guide process B, the main control device 11 further executes a guide process C (S12). In the guide process C, the main control device 11 outputs information displayed in the non-cognition display unit to which the highest priority order is assigned, by sound through a loudspeaker (not shown). Specifically, for example, in a state in which the line of sight of the driver does not overlap with the head-up display 13 on which the blind spot screen is shown, when the line of sight of the driver is not directed to any of the remaining display units 12, 14, the main control device 11 outputs information indicating the content of the blind spot screen in a simplified manner, for example, sound information saying "There is a car on the backward right". Upon completion of the guide process C, the main control device 11 shifts the process to the process in S6. The main control device 11 may execute only one of the guide processes B, C.

According to the information display system 10 of this embodiment, the guide process is executed when the driver does not perceive the non-cognition display unit to which the highest priority order is assigned. The guide process is able to lead the line of sight of the driver to a display unit to which the highest priority order is assigned. Therefore, it is possible to cause the driver to preferentially perceive a display unit on which important information to be perceived is displayed.

Further, according to the information display system 10, when the line of sight of the driver overlaps with any of the display units 12, 13, 14 in a state in which information is being displayed, this display unit is specified as the cognition display unit. Specifically, the driver may not perceive information even when the driver sees a display unit on which no information is displayed. According to this embodiment, even when the driver sees a display unit on which no information is displayed, it is possible to prevent this display unit from being set as the cognition display unit. Therefore, it is possible to ensure that the driver perceives information displayed on the display unit.

Moreover, according to the information display system 10, when the line of sight of the driver overlaps with the non-cognition display unit, this non-cognition display unit is specified as the cognition display unit. Specifically, by setting the non-cognition display unit that the driver sees even once, again as a cognition processor, it is possible to reduce a number of display units subjected to the guide process as needed. Therefore, it is possible to sequentially lead the line of sight of the driver to a display unit that is not seen. In addition, it is possible to prevent the line-of-sight from needlessly being lead again to the cognition display unit even though the driver has already perceived the display unit. Furthermore, it is possible to gradually reduce processing load as the number of display units subjected to the guide process may be sequentially reduced.

Further, according to the information display system 10, the guide process is executed when a priority order assigned to the non-cognition display unit is equal to or higher than the predetermined value. Therefore, by setting the predetermined value in advance in connection with safety of a person on the vehicle, it is possible to preferentially lead the line of sight of the driver to a display unit on which important information in terms of safety is displayed.

Moreover, according to the information display system 10, by the guide process, the direction in which the non-cognition display unit to which a higher priority order, in this case, the highest priority order, is assigned is present is displayed on the display unit with which the line of sight of the driver overlaps. With this, the driver is able to move the line-of-sight smoothly to the non-cognition display unit on which information to be perceived is displayed.

Furthermore, according to the information display system 10, by the guide process, simplified information of information displayed on the non-cognition display unit to which a higher priority order, in this case, the highest priority order, is assigned is displayed on the display unit with which the line of sight of the driver overlaps. Therefore, it is possible to cause the driver to immediately perceive the important information to be perceived even though in a simplified manner.

Further, according to the information display system 10, by the guide process, the name of the non-cognition display unit to which a higher priority order, in this case, the highest priority order, is assigned is output by sound. With this, the driver is able to immediately and auditorily recognize which display unit displays information to be perceived. In addition, the driver is able to smoothly move his/her line-of-sight to this display unit.

Moreover, according to the information display system 10, by the guide process, information displayed on the non-cognition display unit to which a higher priority order, in this case, the highest priority order, is assigned is output by sound. With this, the driver is also able to auditorily perceive information to be perceived. For example, during driving of the vehicle, it is difficult for the driver to move his/her line-of-sight to a display unit. In such a case, the driver is also able to auditorily perceive information to be perceived, and therefore driving safety may not be ruined.

The flowchart or the process of the flowchart described in the present application includes a plurality of steps (or also referred to as sections), and each of the steps is indicated as S1, for example. Further, each of the steps may be divided into a plurality of substeps, or a plurality of steps may be combined to constitute a single step.

The components in this embodiment are set by classifying an interior of the main control device 11 for descriptive purposes focusing on functions, and this does not mean that the interior of the main control device is physically divided into parts corresponding to the respective components.

The information acquisition processor 31 corresponds to the information acquisition portion of the present disclosure, the sight line specifying processor 32 corresponds to the sight line specifying portion, the cognition display unit specifying processor 33 corresponds to the cognition display unit specifying portion, the non-cognition display unit specifying processor 34 corresponds to the non-cognition display unit specifying portion, the priority order assigning processor 35 corresponds to the priority order assignment portion, and the guide process execution processor 36 corresponds to the guide process execution portion.

It should be noted that the present disclosure is not limited to the embodiment described above, and may be applied to various embodiments without departing from the scope of the present disclosure. For example, instead of assigning a priority order to a display unit, a priority order may be assigned to a content itself displayed on the display unit, and the guide process may be performed so as to lead the line of sight of the driver to a display unit on which information to which a higher priority order is assigned is displayed.

The invention claimed is:

1. An information display system displaying different information on each of a plurality of display units, the information display system comprising:
   a control unit having a processor and configured to:
   specify a line of sight of a driver;
   specify, as a cognition display unit perceived by the driver, one of the display units being in a direction of the specified line of sight specified by the control unit;
   specify, as a non-cognition display unit, a different one of the display units being not specified as the cognition display unit;
   assign a priority order to the non-cognition display unit or to displayed information displayed on the non-cognition display unit based on information displayed on the non-cognition display unit; and
   when the specified line of sight of the driver is not directed to the non-cognition display unit having a higher priority order or the displayed information having a higher priority order, after the priority order has been assigned to the non-cognition display unit or the displayed information displayed on the non-cognition display unit, execute a guide process in which the line of sight of the driver is guided to the non-cognition display unit having the higher priority order or the displayed information having the higher priority order.

2. The information display system according to claim 1, wherein:
   when the specified line of sight overlaps with one of the display units displaying information,
   the control unit is configured to specify the one of the display units as the cognition display unit.

3. The information display system according to claim 1, wherein:
   when the specified line of sight overlaps with the non-cognition display unit,
   the control unit is configured to specify the non-cognition display unit as the cognition display unit.

4. The information display system according to claim 1, wherein:
   the control unit is configured to execute the guide process when the priority order assigned to the non-cognition display unit or to the displayed information displayed on the non-cognition display unit is equal to or higher than a predetermined value.

5. The information display system according to claim 1, wherein:
   as the guide process, the control unit is configured to indicate a direction in which the non-cognition display unit or to the displayed information displayed on the non-cognition display unit to which the higher priority order is assigned is present, on the display unit with which the specified line of sight overlaps.

6. The information display system according to claim 1, wherein:
   as the guide process, the control unit is configured to display simplified information of the information displayed on the non-cognition display unit or to the displayed information displayed on the non-cognition display unit to which the higher priority order is assigned, the simplified information being displayed on the display unit with which the specified line of sight overlaps.

7. The information display system according to claim 1, wherein:
   as the guide process, the control unit is configured to output, by sound, a name of the non-cognition display unit or to the displayed information displayed on the non-cognition display unit to which the higher priority order is assigned.

8. The information display system according to claim 1, wherein:
   as the guide process, the control unit is configured to output, by sound, the information displayed on the non-cognition display unit or to the displayed information displayed on the non-cognition display unit to which the higher priority order is assigned.

* * * * *